(12) United States Patent
Gervais et al.

(10) Patent No.: US 10,820,483 B2
(45) Date of Patent: *Nov. 3, 2020

(54) AIR CART FAN CONTROL

(71) Applicant: CNH Industrial Canada, Ltd., Saskatoon (CA)

(72) Inventors: Joel Gervais, Saskatoon (CA); Ian Paulson, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 181 days.

This patent is subject to a terminal disclaimer.

(21) Appl. No.: 16/124,760

(22) Filed: Sep. 7, 2018

(65) Prior Publication Data

US 2020/0077570 A1 Mar. 12, 2020

(51) Int. Cl.
*A01C 7/08* (2006.01)
*A01C 21/00* (2006.01)
(Continued)

(52) U.S. Cl.
CPC .............. *A01C 7/084* (2013.01); *A01C 7/105* (2013.01); *A01C 7/205* (2013.01); *A01C 21/005* (2013.01)

(58) Field of Classification Search
CPC ........... A01C 7/084; A01C 7/081; A01C 7/08; A01C 7/00; A01C 7/105; A01C 7/102;
(Continued)

(56) References Cited

U.S. PATENT DOCUMENTS 5,996,516 A 12/1999 Bennewis et al.
6,003,455 A 12/1999 Flamme et al.
(Continued)

FOREIGN PATENT DOCUMENTS

EP 1889532 A2 2/2008
WO 2008/155234 A2 12/2008
(Continued)

OTHER PUBLICATIONS

Dakota; 1910 Air Cart Maintenance & Optimization; Retrieved on Apr. 2, 2018—http://www.dakotafarmequip.com/application/files/3514/6819/2983/AirDrill_Clinic_2011.pdf—(65) pages.

(Continued)

*Primary Examiner* — Christopher J. Novosad
(74) *Attorney, Agent, or Firm* — Rebecca L. Henkel; Rickard K. DeMille

(57) ABSTRACT

A pressure gradient or differential in a product distribution line for conveying granular particulate material, including at least one of seed or fertilizer, in an air flow to an agricultural field consistently decreases as air speed and velocity in the product distribution line decreases until a critical air speed is reached. Below the critical air speed, the particulate material may become susceptible to falling out of the air flow to potentially cause a blockage in the system. Accordingly, pressure sensors arranged in the product distribution line can be used to generate an air flow at an optimum velocity above the critical air speed yet below a maximum air speed associated with inefficient operation. The air flow can be adjusted to maintain the optimum velocity despite changes in at least one of a type of particulate material or a rate at which the particulate material is metered.

11 Claims, 7 Drawing Sheets

(51) Int. Cl.
*A01C 7/20* (2006.01)
*A01C 7/10* (2006.01)

(58) Field of Classification Search
CPC ........... A01C 7/10; A01C 7/205; A01C 7/201; A01C 7/20; A01C 21/005; A01C 21/00
See application file for complete search history.

(56) References Cited

U.S. PATENT DOCUMENTS

| | | | |
|---|---|---|---|
| 8,746,158 B2* | 6/2014 | Binsirawanich | G01F 1/74 |
| | | | 111/174 |
| 8,928,486 B2 | 1/2015 | Hui et al. | |
| 9,788,475 B2 | 10/2017 | Henry | |
| 9,814,175 B2 | 11/2017 | Henry | |
| 9,869,571 B2 | 1/2018 | Hoberge et al. | |
| 2016/0157418 A1 | 6/2016 | Henry | |
| 2016/0219781 A1 | 8/2016 | Henry et al. | |
| 2018/0054956 A1 | 3/2018 | Henry | |

FOREIGN PATENT DOCUMENTS

| | | |
|---|---|---|
| WO | 2014/098749 A1 | 6/2014 |
| WO | 2014/123480 A1 | 8/2014 |

OTHER PUBLICATIONS

Salford; AC1000 Single-Tank Air Cart; Retrieved Apr. 2, 2018—https://salfordgroup.com/ac1000-single-tank-air-cart/—(7) pages.
Western Producer—John Deere upgrades air cart, drill; Robin Booker; Retrieved Sep. 5, 2018—https://www.producer.com/2016/06/john-deere-upgrades-air-cart-drill/—(5) pages.

* cited by examiner

AIR CART FAN CONTROL

FIELD OF THE INVENTION

The present invention relates generally to systems for distributing particulate material to agricultural fields, and more particularly, to such systems having pressure sensors in product distribution lines for conveying the particulate material in which pressure gradients calculated from the pressure sensors are used to control an air source to maintain an air flow at a velocity below a maximum velocity producible by the air source and above a minimum velocity causing a minimum pressure gradient.

BACKGROUND OF THE INVENTION

Generally, a tractor or work vehicle tows seeding or fertilizing implements via a hitch assembly that connects to a rigid frame of a planter, seeder or fertilizer applicator. These crop production systems typically include one or more delivery lines that carry particulate material, such as seed or fertilizer. In certain systems, ground engaging tools are used to break the soil to deposit the particulate material carried by these delivery lines. After depositing the particulate material, each ground engaging tool is typically followed by a packer wheel that packs the soil on top of the deposited material. For other crop production systems, particulate material may simply be spread onto the crops.

In certain configurations, an air cart is used to meter and deliver the particulate material through the particulate delivery lines to the soil. As the particulate material moves through the delivery lines, the particulate material can create blockages in one or more of the delivery lines. Such blockages can cause uneven delivery of product and reduce crop yields overall.

It is known for certain crop production systems to drive particulate material through the delivery lines using very high air speed to entrain the material in order to ensure the possibility of a blockage is reduced. However, driving the particulate material at such high air speeds can cause other problems in the system, such as: damage to the particulate material due to impacting surfaces at forces that are too great; missing depositing targets for the particulate material due to the material bouncing on the ground; and/or consumption of excess power by continuously requiring fans to produce the high air speeds. What is needed is an improved system for depositing particulate material that eliminates one or more of the foregoing disadvantages.

SUMMARY OF THE INVENTION

The present inventors have recognized that a pressure gradient or differential in a product distribution line for conveying granular particulate material, such as seed or fertilizer, in an air flow to an agricultural field consistently decreases as air speed (velocity) in the product distribution line decreases until a critical air speed is reached. Below the critical air speed, the particulate material may become susceptible to falling out of the air flow to potentially cause a blockage in the system. Accordingly, pressure sensors arranged in the product distribution line can be used to generate an air flow at an optimum operating velocity above the critical air speed yet below a maximum air speed associated with inefficient operation. In one aspect, the air flow can be adjusted to maintain an optimum operating velocity despite changes in the type of particulate material and/or rate at which the particulate material is metered.

In one aspect, total pressure drop and local pressure drops in specific locations can be monitored along the path of the hose. The monitored data can be interpreted for control of an air source. Also, the hose routing can be physically manipulated to respond more quickly by increasing the diameter of a section of the hose (up to 15% larger) before any bend or even a straight section. By measuring the local pressure drop from an upstream point to a point on the larger diameter region the trend that appears can give an earlier indication that product may start falling out of the airstream before it actually happens. As seeding tool widths get larger and conveying lines get longer it may become even more beneficial to monitor product flow status in these lines. Longer lines may also require higher air velocity to move product effectively. Standard practice is to do a "fountain test" to ensure a 12-24 inch fountain of product is exiting one of the hoses at an opener on the outer section to set the air flow. Users who do not do this can instead simply set their fan at a significantly high rate so that the system never becomes blocked. However, with the increasing use of variable product application rates across the tool (varying seed and/or fertilizer rates according to a prescription map) a user may be wasting air. The present invention provides a system for monitoring the status of the product flow in the airstream to match the fountain test, or potentially even lower, to avoid blockages by controlling the fan based on the product rate. The system can utilizes at least one local pressure measurement region, preferably at a known "high" pressure drop location, to act as an early warning monitor of the product flow status before the critical air speed is reached. The system can also utilize pressure taps so the total pressure drop can be monitored. A slight increase in hose diameter (on the order of 5-20%) over the designated local pressure region can help give provide an early predictive characteristic.

As a result, the fan can safely operate at a lower air speed, because the flow monitoring of the local regions gives early warning well before settling of product happens in the line. With the fan running safely at lower speeds, power savings can be realized in the system. Also, safer conveying conditions for seeds (reducing or eliminating damage) and fertilizer (reducing damage in the conveying line) can be achieved. Lower exit velocities into furrow also yields a higher probability that more product will end up where desired and be less susceptible to bouncing out of the soil furrow.

In one aspect, pressure taps can be added to the conveying line at a specified local region depending on hose routing configurations. At least one pressure tap can be provided at a beginning and end of at least one line in the system. Also, a slight increase in diameter over a section of pipe in a local pressure region can provide further improvements. A controller can execute to monitor pressure trends versus air speed (or fan speed).

Air pressure taps in a primary conveying line can be monitored for pressure drops along the entire length. Local pressure drops along the line can also be monitored. For representation here [3b] is straight section before the bend where two pressure taps are located 0.5-2 m apart. The location of this local pressure measurement region is more effective if it is located at a region along the line that would be more likely to plug or considered "high" pressure drop regions. For this representation just before the bend makes sense. These local pressure regions do not need to be before a bend, they could easily be on a straight section anywhere along the line but to minimize the number of local pressure regions it is wise to aim for a "high' pressure drop region along the distribution system. It is important to note that multiple local regions along the pipe could be monitored for even more resolution. Monitoring these pressure drops along the lines in relation to fan speed (air flow or air velocity if that sensor is present), a consistent decrease in pressure drop per unit length of hose line length (kPa/m) with a decrease in air velocity down (m/s) can be measured, down to a minimum. This minimum is considered the critical conveying velocity and is really the lowest conveying velocity you can achieve before product actively starts falling out of the airstream (see FIGS. 4 and 5 for a visual representation).

In another aspect, a manual procedure of setting a fan speed by monitoring product flow height can be replaced. Instead, an operator can set an operating point using measured values from one or more differential pressure sensors, particle speed sensors, or air speed/flow sensors. A table of predetermined set-point values that provide satisfactory product flow performance could be referenced by a control system of the air cart/drill which could be determined at a factory and/or by an operator. Environmental sensors, such as temperature (in-line and ambient), relative humidity, and/or barometric pressure, could be measured in conjunction with the previous sensing options. These environmental sensors could be incorporated into the control system for establishing pre-determined set-point values and actively controlling the fan. For example, the same fan setting can result in different carrying capacities depending on ambient operating conditions. Regardless of operator-selected and/or factory-set operating points, the control system could modify flow to a hydraulic motor that powers a pneumatic conveying fan such that the difference between the set-point and sensor value(s) is minimized, thereby keeping the pneumatic conveying system operating in a satisfactory performance state while the air drill/car control system is engaged.

In another aspect, a process can be implemented for automatically learning an optimum set-point for the control system of the pneumatic conveying system of an air cart/drill assembly, with minimal user input. A calibration procedure can be initiated which first determines if the selected product mass flow rate is new (i.e., the system has not operated at this mass flow rate before, and thus a calibration value needs to be determined). If the current mass flow rate is not new, then a previously established safe air speed, $v_{safe}$, can be recalled and can be the set-point for the control system for operation. With a new product mass flow rate (i.e., $v_{safe}$ for this product mass flow rate has not been established), the target air speed can be set to a default maximum value, $v_{default}$, to ensure that plugging will not occur (since the air speed will be excessively high to begin with). Once the measured air speed has achieved $v_{default}$, a measured pressure gradient across a monitoring region can be recorded. The air speed can then be decreased by a small increment by reducing the fan speed. As shown and described more fully below, including at FIGS. 4 and 5, at this newly established speed, another pressure gradient measurement can be recorded. With two pressure gradient measurements at two different speeds, a slope of the pressure gradient vs. air speed curve can be approximated by the most recent pressure gradient measurement subtracted from the prior pressure gradient measurement, divided by the most recent air speed setting subtracted from the prior air speed setting. If the subtracted quantities are both positive, then the slope of the operating curve in the current region is positive, and the new operating point is to the right of $v_{critical}$. The current air speed is saved as an intermediate value of $v_{critical}$ because, until a lower air speed can be tested, the current air speed is the last known value to the right of the true critical air speed. The process can be repeated by reducing the fan speed by an increment and measuring the pressure drop in the system after reaching the new steady-state air speed. If the difference in pressure gradient measurements has a sign opposite to the change in air speed, the new operating point represents an increase in pressure gradient for a decrease in air speed. This new point is to the left of the true critical air speed, therefore the previous air speed setting is the closest known value to the critical air speed. The previous air speed remains as $v_{critical}$. To maintain a safe operating margin from air speeds that risk plugging, a margin $\delta$ can be added to $v_{critical}$. Finally, $v_{safe}$, the safe operating target air speed for the current product mass flow can be calculated as $v_{safe}=v_{critical}+\delta$. The value of $\delta$ can be either pre-programmed during product development or set by the operator, for example. Aside from product type, and potentially product mass flow rate (either of which may be provided from an operator to operate an air cart), $\delta$ could be the only operator-determined input value to operate the system. This calibration procedure could be done manually or automatically via a controller or ISO Bus Class 3 operation with minimal to no input from an operator.

In another aspect, changes in cross-sectional dimensions of a pneumatic conveying pipe/hose can be used to determine if deviations from a current state of a pneumatic conveying system will increase the risk of plugging the system. By applying an effect in which changes in cross-sectional diameter have on flow conditions, a control system can be applied to a candidate region of the pneumatic conveying system. A set-point determined from the automatic fan control calibration procedure above can then be used to inform the set-point for controlling the fan. This may eliminate a need for the operator- or factory-determined safe operating points to be pre-determined. Thus, after a system state diagram is created from a calibration method, an auto fan control method can simply follow a system state diagram to ensure the system operates in an efficient range. This range can be as low as the pressure minima or as high as the known fountain test set point as desired. In making the seeding system self-learning, utilizing the auto calibration procedure with the flow monitoring procedure, the system can determine where the pressure minima is for each product and be able to predict well in advance before arrival in the pressure minima region. Increasing product mass rate wili shift the curves up and to the right slightly, but this can be established with the auto calibration procedure so the fan control can follow the state diagram for safe and efficient conveying. This type of control system may be advantageous when used with fully or autonomous seeding systems.

Specifically then, one aspect of the present invention can provide a system for distributing particulate material to an agricultural field, including: a meter module configured to dispense particulate material to a product distribution line; an air source configured to entrain the particulate material in an air flow for transferring the particulate material through the product distribution line; first and second pressure sensors arranged at first and second locations of the product distribution line, respectively, the first pressure sensor being arranged at a first location nearer to the meter module and the second pressure sensor being arranged at a second location further from the meter module, in which each pressure sensor is configured to indicate a pressure at a location in the product distribution line; and a controller in communication with the air source and the first and second pressure sensors. The controller can execute a program stored in a non-transient medium to: determine a pressure gradient in the product distribution line by calculating a difference between first and second pressures indicated by the first and second pressure sensors, respectively; and control the air source to maintain the air flow at a velocity below a maximum velocity producible by the air source and above a minimum velocity causing a minimum pressure gradient.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

DETAILED DESCRIPTION OF THE PREFERRED EMBODIMENTS

Figure 1:
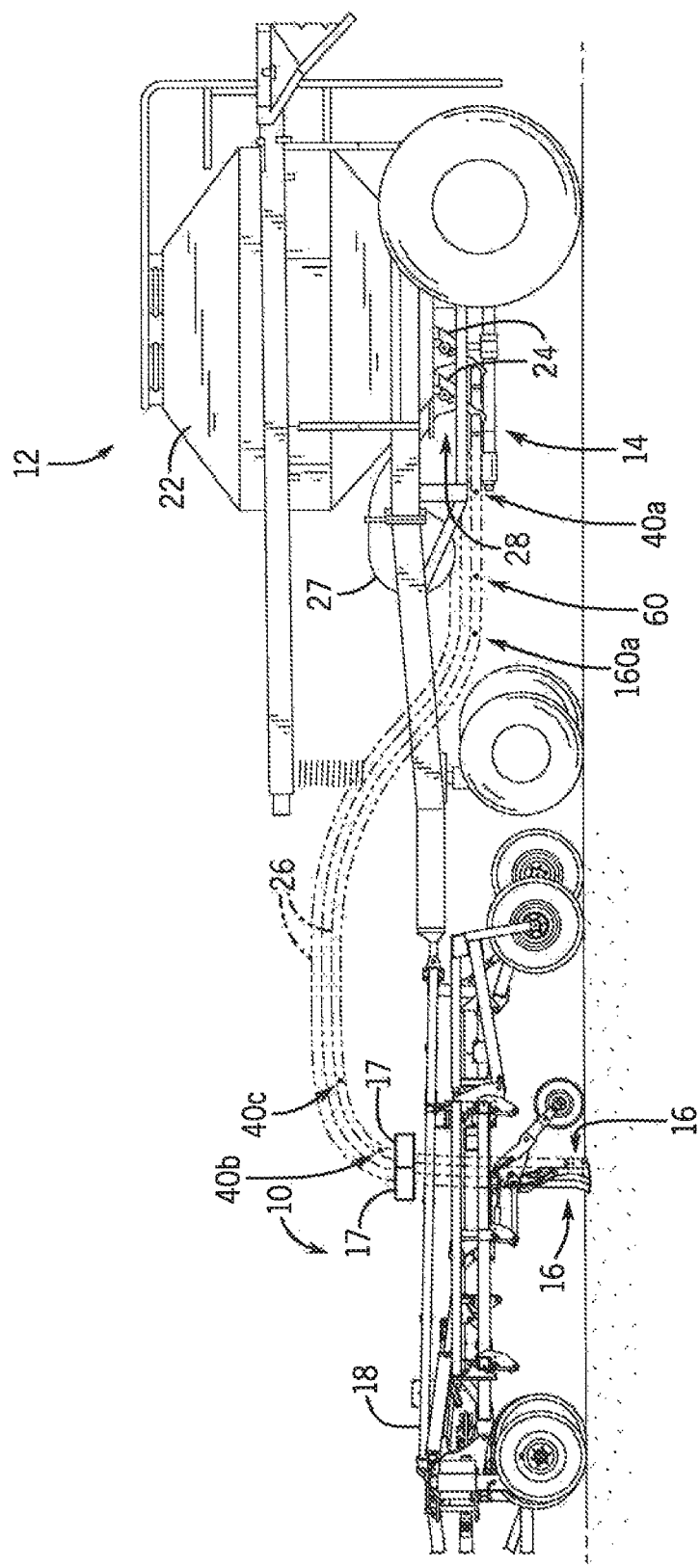
FIG. 1 is a side view of an exemplar agricultural implement coupled to an air cart which includes a system for distributing particulate material to an agricultural field in accordance with an aspect of the invention.

Referring now to the drawings and specifically to FIG. 1, a side view of an exemplar agricultural implement 10, which may be a seeding implement or tool, coupled to an air cart 12 having a control system 14 is provided in accordance with an aspect of the invention. The implement 10 includes multiple row units 16 and multiple distribution headers 17 supported by a frame 18. Each distribution header 17 is configured to receive agricultural particulate material, such as seed or fertilizer, from the air cart 12, and to route the product to each row unit 16. The row units 16, in turn, may be configured to deposit the agricultural product onto the soil as the implement 10 travels across an agricultural field. As shown, the air cart 12 can be coupled to the implement 10 via the frame 18. The air cart 12 may include one or more product storage tanks 22 configured to store one or more agricultural products (particulate material). Each product storage tank 22 is coupled to a corresponding metering subassembly 28, which includes multiple meter modules 24, each coupled to a corresponding primary product distribution line 26 (primary lines) that is configured to distribute agricultural product to one or more corresponding headers 17 of the implement 10. The meter modules 24 may be in fluid communication with the headers 17. Each meter module 24 may include an actuator and a meter roller, where the actuator may be configured to drive the meter roller to dispense agricultural product from the storage tanks 22. In some embodiments, the meter module 24 may include a gate and the actuator may drive the gate. The meter modules 24 may be controlled by the control system 14. An air source 27 which could comprise an electric or hydraulic fan provides an air flow to each of the primary lines 26. The metered agricultural product is entrained within the air flow and pneumatically transferred to the one or more corresponding headers 17 of the implement 10. While two meter modules 24 and two primary lines 26 are shown for clarity, it should be appreciated that, in certain embodiments each metering subassembly 28 may include at least 4, 6, 8, 10, 1.2, 14, 16, 18, 20 or more meter modules 24 and/or primary lines 26. Furthermore, one meter module 24 may provide the particulate material to one or more primary lines 26 which could be a subset of the primary lines 26. Additionally, while two headers 17 are shown for clarity, it should be appreciated that in some embodiments the implement 10 may include at least 1, 2, 4, 6, 8, 10, 12 or more headers 17. It should also be appreciated that while two row units 16 are shown for clarity, in certain embodiments, the implement 10 may include at least 4, 6, 8, 10, 12, 14, 16, 18, 20 or more row units 16, and furthermore, that each primary line 26 may provide the particulate material to any suitable number of row units 16. Similarly, while one product storage tank 22 is illustrated by way of example, it should be appreciated that in certain embodiments the air cart 12 may include at least 2, 3, 4, 5, 6 or more product storage tanks 22.

Figure 2:
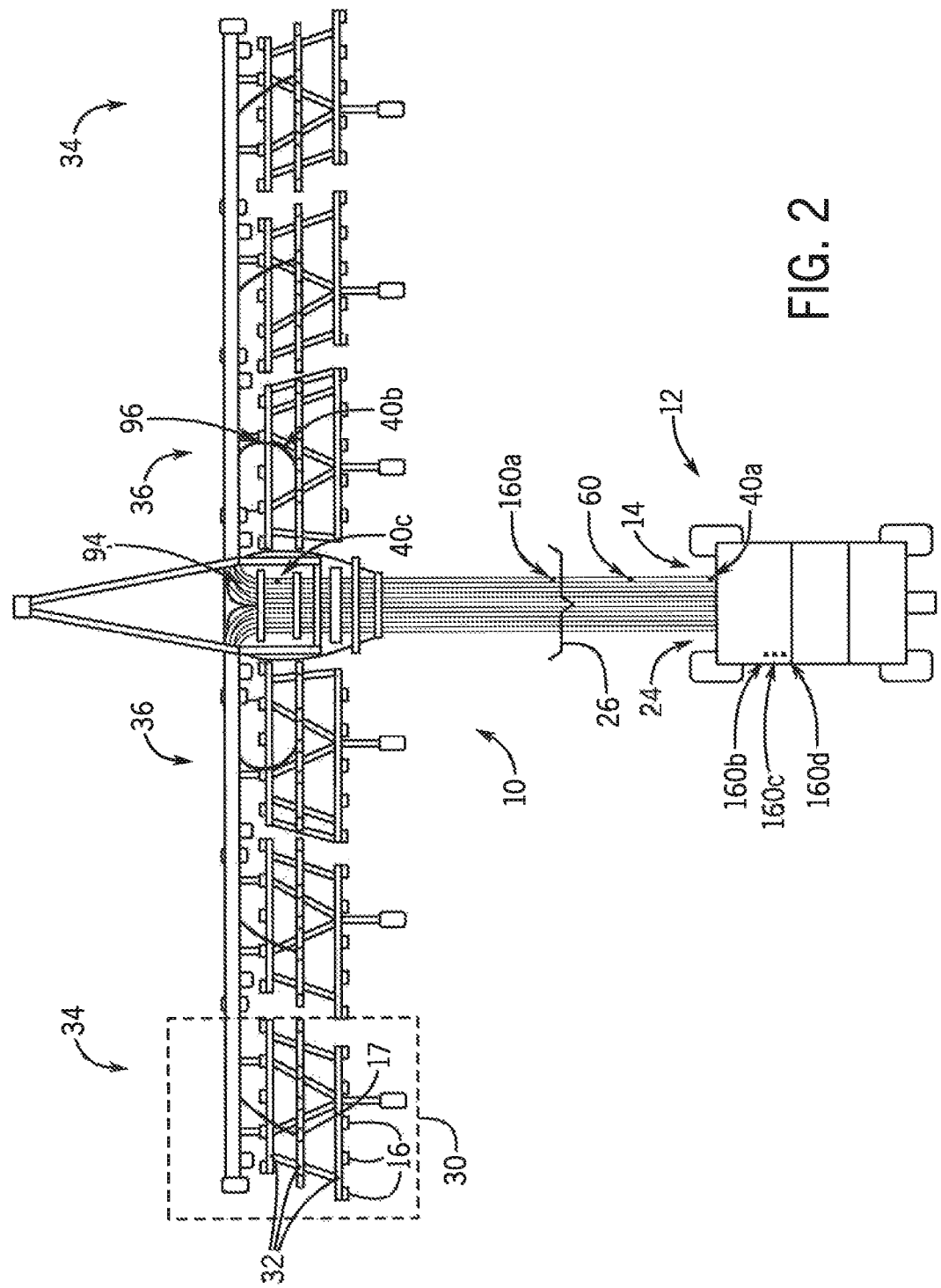
FIG. 2 is a top view of the agricultural implement coupled to the air cart of FIG. 1.

With additional reference to FIG. 2, a top view of the agricultural implement 10 coupled to the air cart 12 of FIG. 1 is provided. As depicted, the implement 10 includes six sections 30 attached to the frame 18 of the implement 10. Each section 30 includes multiple row units 16 attached to crossbars 32. Laterally displacing the row units 16 in the illustrated manner may enable a dense disbursement of product across a wide swath of soil. In addition, each section 30 may include one header 17 that receives agricultural product metered by a respective meter module 24 into a respective attached primary line 26. As such, there may be six meter modules 24 and six primary lines 26 in the depicted embodiment, one for each header 17, for example. The headers 17 may route the product to the respective multiple row units 16 to distribute the product to the ground. In some embodiments, each section 30 may include any number of suitable headers 17 and/or row units 16. The sections 30 may have any suitable configuration.

In accordance with an aspect of the invention, the system can include multiple pressure sensors 40 arranged at predetermined locations of one or more of the primary lines 26, such as a first pressure sensor 40a arranged at first location of a primary line 26a nearer or proximal to the meter module 24a, such as at a region of the air cart 12, and a second pressure sensor 40b arranged at second location of the same primary line 26a further from or distal to the meter module 24a, such as at a region of the implement 10 near a crossbar 32. Each pressure sensor 40 can be configured to indicate a static or dynamic pressure measurement at a location in the primary line 26 where the pressure sensor is installed. The pressure sensor 40 can provide the pressure value to a controller for operation and control in the system as described, herein. Each pressure sensor 40 could comprise, for example, a pressure tap consisting of hole in the primary line 26 with a pressure transducer (a device which generates an electrical signal as a function of the pressure imposed) mounted therein. Additional pressure sensors 40, such as a third pressure sensor 40c arranged at a third location of the primary line 26a, between the first and second pressure sensors 40a and 40b, respectively, can be included in the same primary line 26 for even more detailed monitoring.

Figure 3:
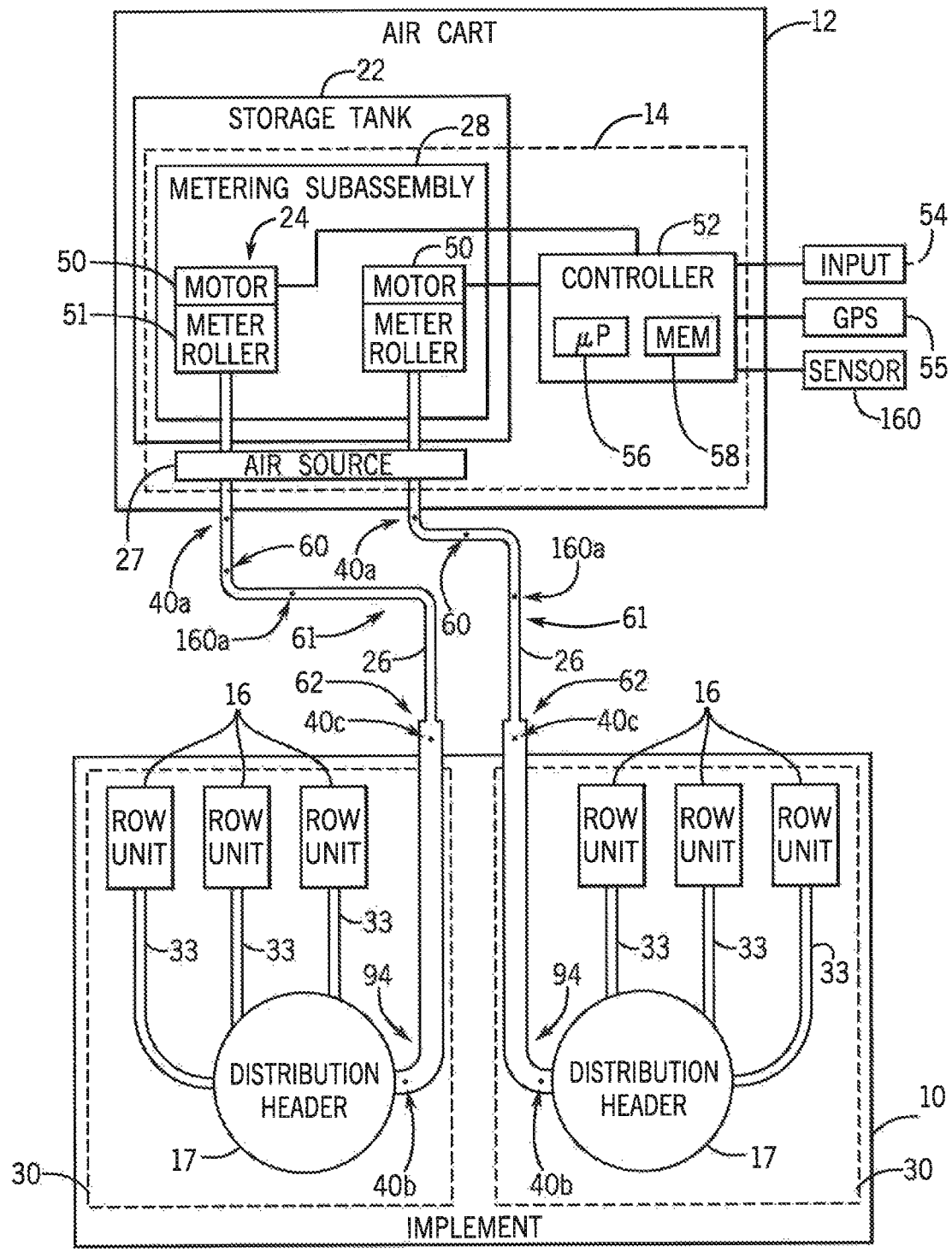
FIG. 3 is a schematic diagram of the system for distributing particulate material of FIG. 1.

With additional reference to FIG. 3, a schematic diagram of a portion of an embodiment of the implement 10 and the air cart 12 is provided. To facilitate discussion, one product storage tank 22 and its corresponding metering subassembly 28 is shown. However, it should be understood that the air cart 12 may include any suitable number of storage tanks 22, and the control system 14 may provide one metering subassembly 28 for each storage tank 22. As shown, the metering subassembly 28 includes two meter modules 24 (e.g., a first metering module and a second metering module), although the metering subassembly 28 may include any suitable number of meter modules 24, as noted above. In the illustrated embodiment, each meter module 24 is configured to meter the particulate material into a corresponding primary line 26. Additionally, the air source 27 is configured to entrain the particulate material in an air flow for transferring the particulate material through each primary line 26 to a distribution header 17 of the implement 10. Although a single air source 27 is shown for providing an air flow for multiple primary lines 26, in other aspects, multiple air sources 27 could be used for individually providing the air flow to one or more primary lines 26. The particulate material entrained in the air flow, in turn, can be transferred the distribution header 17. The distribution header 17, in turn, can distribute the entrained particulate material into one or more corresponding secondary lines 33 extending to a corresponding row unit 16. Each meter module 24 and corresponding primary line 26 may thus provide agricultural product to separate sections 30 (e.g., a first section and a second section) of the implement 10. Because each meter module 24 may be separately controlled, the row units 16 of one section 30 may apply the particulate material at a different rate than the row units 16 of another section 30. Thus, the particulate material may be applied at different rates across a width of the implement 10, and the application rate provided by each section 30 may be adjusted independently as the implement 10 travels across the field. As noted above, it should be appreciated that although each meter module 24 is shown coupled to a single corresponding primary line 26, in some embodiments, each meter module 24 may be coupled to two or more primary lines 26, and thus may deliver product to two or more sections 30 (e.g., a subset of sections 30), for example.

As shown, each meter module 24 includes an actuator 50 (e.g., motor) configured to actuate (e.g., drive rotation of) a respective meter roller 51 (e.g., meter). In some embodiments, each actuator 50 may drive rotation of a drive shaft coupled to the respective meter roller 51. Although each meter module 24 includes the actuator 50, in some embodiments, the respective meter roller 51 of each meter module 24 may be driven into rotation via any suitable mechanism. The control system 14 also includes a controller 52 that may be located on the air cart 12 and/or be communicatively coupled to each the pressure sensors 40, the air source 27 and/or the metering subassembly 28. The controller 52 is configured to receive feedback from the pressure sensors 40 and control the air source 27 to increase or decrease the air flow as desired. In one aspect, the controller 52 can control the air source 27 to increase or decrease the air flow, in response to a change in a pressure gradient measured between pressure sensors 40 in a primary line 26, such as by increasing or decreasing power to an electrically driven fan and/or hydraulic fluid to a hydraulically driven fan. The controller 52 can also be configured to control each actuator 50 to adjust a metering rate (e.g., meter roller turn rate) of its respective meter module 24. In certain embodiments, the controller 52 is an electronic controller having electrical circuitry configured to process signals (e.g., signals indicative of a prescription rate map and/or prescribed application rates) from an input 54 (e.g., map or rate input, position, speed, product delay, width and/or geometry of respective geographic regions of the field) and/or from other components of the metering system 14. For example, the input 54 may be configured to provide signals indicative of desired product application rates for various regions of the field. In some embodiments, the input 54 may be a Human Machine Interface (HMI) having a processor and a memory, and the input 54 may be used to receive input from an operator to determine target application types (e.g., seed(s), such as peas or canola, and/or fertilizer(s)) and/or rates (e.g., in units of mass per area) and to provide the target application types and/or rates to the controller 52.

In the illustrated embodiment, the controller 52 includes a processor, such as the illustrated microprocessor 56, and a memory device 58. The controller 52 may also include one or more storage devices and/or other suitable components. The processor 56 may be used to execute software, such as software for controlling the air source 27 and/or the metering subassembly 28 in the control system 14. Moreover, the processor 56 may include multiple microprocessors, one or more "general-purpose" microprocessors, one or more special-purpose microprocessors, and/or one or more application specific integrated circuits (ASICS), or some combination thereof. For example, the processor 56 may include one or more reduced instruction set (RISC) or complex instruction set (CISC) processors.

The memory device 58 may include a volatile memory, such as random access memory (RAM), and/or a nonvolatile memory, such as ROM. The memory device 58 may store a variety of information and may be used for various purposes. For example, the memory device 58 may store processor-executable instructions (e.g., firmware and/or software) for the processor 56 to execute, such as instructions for controlling the air source 27 and/or the metering subassembly 28 in the control system 14. The storage device(s) (e.g., nonvolatile storage) may include read-only memory (ROM), flash memory, a hard drive, or any other suitable optical, magnetic, or solid-state storage medium, or a combination thereof. The storage device(s) may store data (e.g., a prescription rate map, location data, implement speed data, or the like), instructions (e.g., software or firmware for controlling the air source 27, the metering subassembly 28 or the like) and/or any other suitable data. The processor 56 and/or memory device 58, or an additional processor and/or memory device, may be located in any suitable portion of the system. For example, a memory device storing instructions (e.g., software or firmware for controlling portions of the control system 14, or the like) may be located on the air cart 12.

In addition, one or more air speed sensors 60 can be arranged in one or more of the primary lines 26. Each air speed sensor 60 can be configured to indicate an air speed measurement at a location in the primary line 26 where the air speed sensor is installed. The air speed sensor 60 can provide the velocity value to the controller 52 for operation and control in the system, including for improved fan control, as described herein. In one aspect, with feedback from the air speed sensor 60, the controller 52 can executes a closed loop control system to maintain the air flow at a desired velocity, such as by executing proportional-integral-derivative control with the desired velocity as a set point and the air speed sensor 60 providing feedback.

Figure 4:
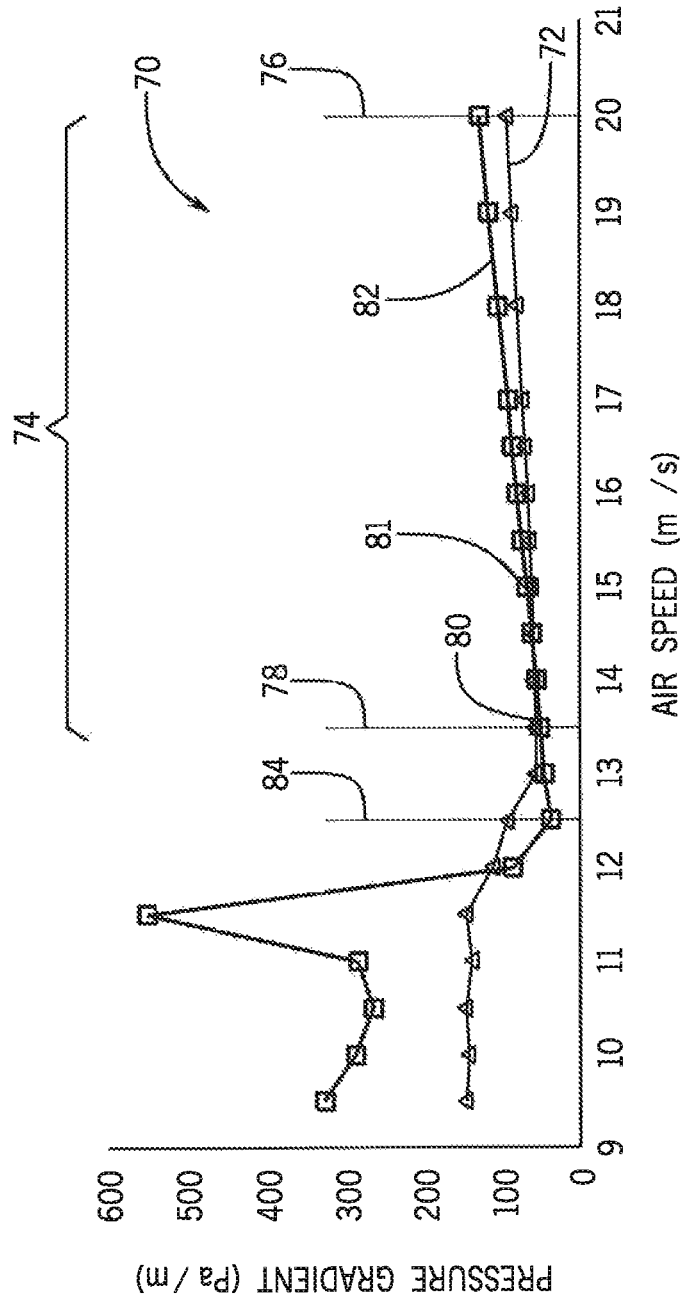
FIG. 4 is a first graph illustrating an exemplary state diagram in which changes in pressure gradients with changes in air flow, including with comparison to an upstream section of a product distribution line, in the system of FIG. 1.

The present inventors have recognized that a pressure gradient or differential in the primary lines 26, when conveying the particulate material in an air flow, consistently decreases as velocity in the primary lines 26 decreases until a "critical" air speed is reached. Below the critical air speed, the particulate material may become susceptible to settling out of the air flow to potentially cause a blockage in the system. By way of example, with additional reference to FIG. 4, a first graph 70 of pressure gradients in a primary lines 26 on a vertical axis (y-axis), versus velocity (or air speed) in the primary lines 26 on a horizontal axis (x-axis), for a given particulate material at a given particulate mass flow rate, is provided. In a first curve 72, representing pressure gradient measurements across the entire primary line 26 which may be determined by the controller 52, from the first pressure sensor 40a at one end of the primary line 26 to the second pressure sensor 40b at another end of the primary line 26, a consistent decrease in pressure gradient with a decrease in velocity can be observed in an operating region 74. For example, from a maximum velocity 76 of air flow in a primary line 26 that is producible by the air source 27, such as 20 m/s, to a critical air speed 78 that occurs when the air flow produced by the air source 27 is decreased, such as 13.5 m/s, the pressure gradient in the primary line 26 consistently decreases from about 90 Pa/m to about 50 Pa/m. This results in a positive slope of the first curve 72 (left-to-right). At the critical air speed 78, a differential pressure minima 80 (minimum pressure gradient) occurs. From the critical air speed 78, with further decreases of the air flow produced by the air source 27, the pressure gradient in the primary line 26 increases sporadically.

As a result, the controller 52, controlling the air source 27 and receiving feedback from the pressure sensors 40, can produce an air flow and determine a pressure gradient for the air flow in the primary line 26 (product distribution line) by calculating a difference between the first and second pressures indicated by the first and second pressure sensors 40a and 40b, respectively. The controller 52 can also adjust the air speed by adjusting the air source 27 to locate the differential pressure minima 80. The controller 52 can then adjust the air speed by again adjusting the air source 27 to maintain the air speed at a velocity above a minimum velocity (above the critical air speed 78) causing the differential pressure minima 80, yet still below the a maximum velocity 76 producible by the air source 27. This can improve efficiency of the system in which damage to the particulate material due to impacting surfaces at excessive speed may be reduced; missing depositing targets for the particulate material due to the material bouncing on the ground may be reduced; and/or consumption of excess power by continuously requiring fans to produce higher air currents may be avoided. In one aspect, the controller 52 can adjust the air speed by adjusting the air source 27 to maintain the air speed at an operating velocity 81 that is configured to be greater than the minimum velocity (above the critical air speed 78) by a predetermined margin, such as an additional 1 m/s, while still achieving benefits with reduction in the air speed as described above.

In a second curve 82, representing pressure gradient measurements which may be determined by the controller 52 across an upstream section of the primary line 26 that is nearer (proximal) to the air cart 12, such as from the first pressure sensor 40a at one end of the primary line 26 to the third pressure sensor 40c (between the first and second pressure sensors 40a and 40b, respectively), a similar pattern to the first curve 72 is apparent. However, based on the location of the differential measurement of the second curve 82, being at the upstream section nearer to the air cart 12, the differential pressure minima of the second curve 82 occurs at a "settling" speed 84 in which the particulate material may settle out of the air flow and begin rolling along the primary line 26. Pressure monitoring of the upstream section by the controller 52 provides increased resolution as to events in the upstream section of the primary line 26. This can provide further insight for monitoring pressure differentials and configuring an air speed set point in pneumatic conveying systems with variable constructions and arrangements.

Figure 5:
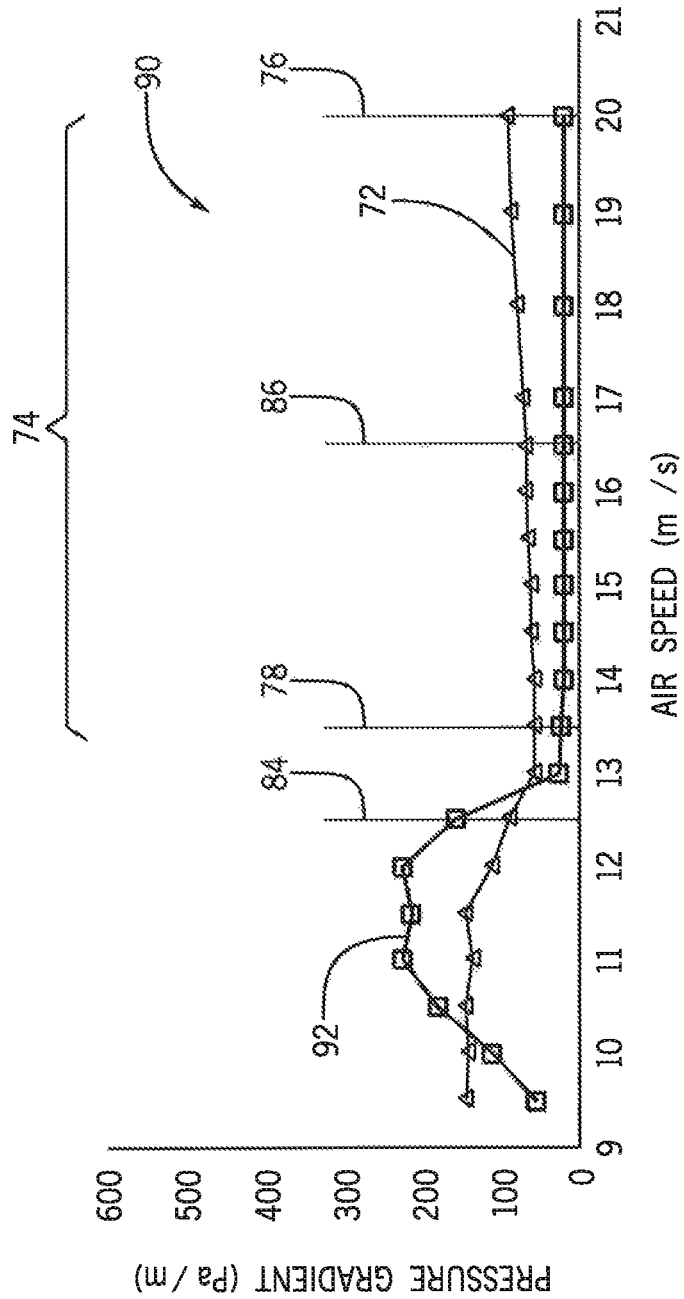
FIG. 5 is a second graph illustrating an exemplary state diagram in which changes in pressure gradients with changes in air flow, including with comparison to a downstream section of a product distribution line, in the system of FIG. 1.

In addition, with further reference to FIG. 5 in which like reference numerals represent like parts throughout, with the third pressure sensor 40c (between the first and second pressure sensors 40a and 40b, respectively), a second graph 90 illustrates a third curve 92 showing additional pressure gradient measurements which may be determined by the controller 52 across a downstream section of the primary line 26 that is further from (distal to) the air cart 12, such as from the second pressure sensor 40b to the third pressure sensor 40c (between the first and second pressure sensors 40a and 40b, respectively). A similar pattern to the first curve 72 is apparent. However, based on the location of the differential measurement of the third curve 92, being at the downstream section further from the air cart 12, the differential pressure minima of the third curve 92 occurs at an "early warning" speed 86, such as 16.5 m/s, indicating a trend toward the critical and settling air speed 78 and 84, respectively. In one aspect, the early warning speed 86 could be determined by the controller 52 as an operating velocity for the air source 27 for safest operation, with heightened margin, such as an additional 3 m/s, while still achieving benefits with reduction in the air speed as described above.

The controller 52 can increase or decrease a rate in which the meter module 24 dispenses the particulate material. The controller 52 can also change a type of particulate material being dispensed, such as from another product storage tank 22. Either of these actions could be taken, for example, upon receiving an input from an operator, such as via the input 54, and/or upon determining a new location on a prescription map, such as via a location sensor 53, which could comprise a Global Positioning System (GPS), comparing a result to a locally stored prescription map. Either a change in the rate of dispensing or a change in the type of particulate material being dispensed could cause a change in the pressure curves illustrated in the first and second graphs 70 and 90, respectively, meaning a change in pressure gradients. Such changes could be monitored by the controller 52 for increasing or decreasing the air speed in response to a new operating velocity based on new pressure minima values as described above.

In one aspect, a diameter of the product distribution line can increase between the aforementioned upstream and downstream sections for monitoring with even greater sensitivity. By physically changing the diameter of the product distribution line, the pressure measurements of FIGS. 4 and/or 5 can be determined by the controller 52 with even greater speed for an early predictive characteristic. For example, referring again to FIG. 3, a diameter of the primary lines 26 can change between an upstream section 61, including the first pressure sensor 40a, and a downstream section 62, including the second pressure sensor 40b. The diameter of the primary lines 26 at the downstream section 62 could be on the order of 5-20% larger than the diameter of the primary lines 26 at the upstream section 61. Moreover, the aforementioned change in diameter could be advantageously implemented before any bend (or even a straight section) of the primary lines 26. For example, referring again to FIG. 2, the primary lines 26 include several straight section with a first bend 94 of some angle, which could be less than or greater than 90°, at the implement 10, toward inner sections 36 of the frame 18, followed by a second bend 96, which could also be less than or greater than 90°, toward crossbars 32 of the frame 18, including toward the outer sections 34. The change in diameter could be implemented before the first bend 94, as contemplated in FIG. 3, and/or before the second bend 96, including, for example, with successively increasing changes in diameter along the primary lines 26.

Figure 6:
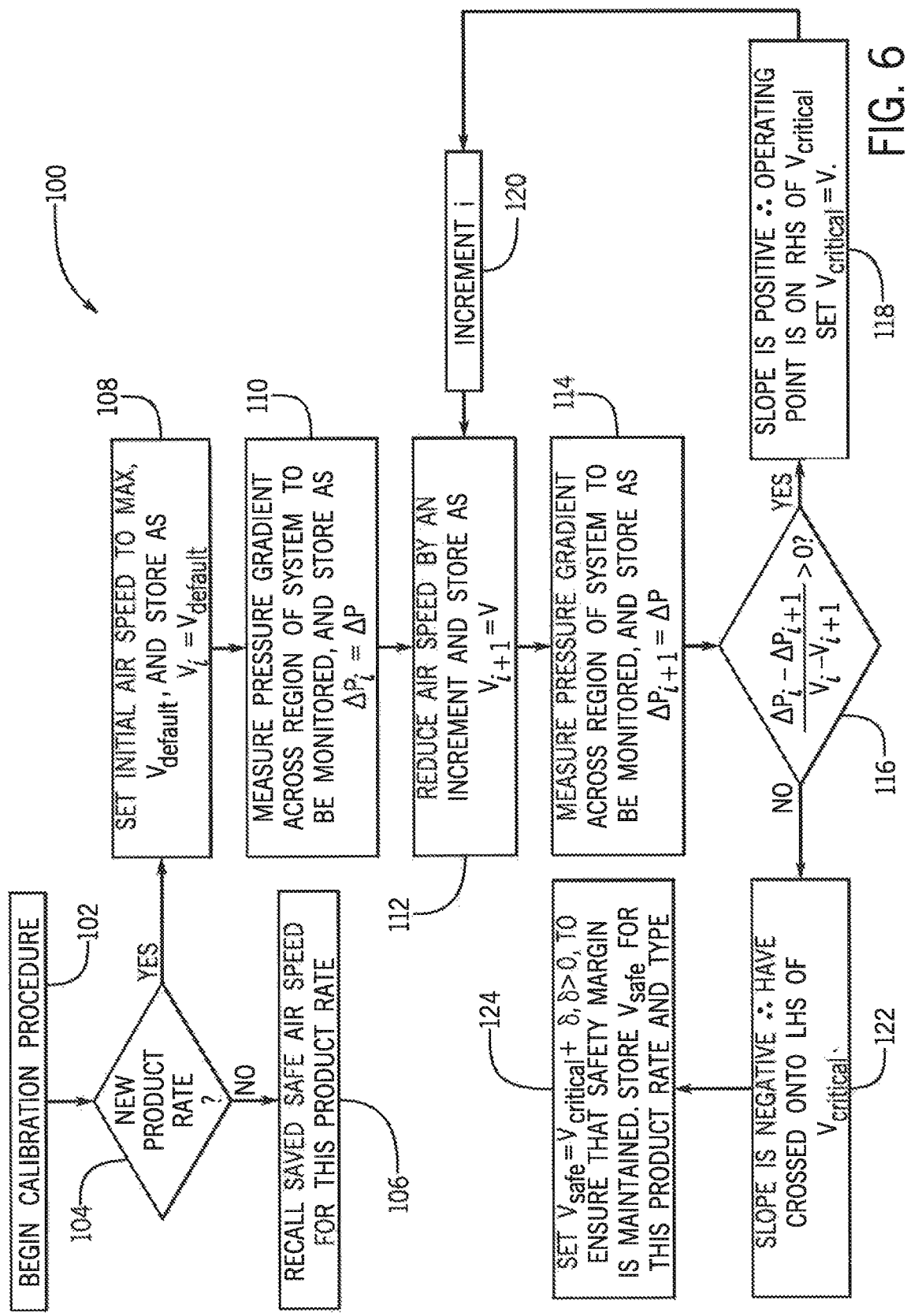
FIG. 6 is a process flow for calibration of an operating velocity for air flow in the system of FIG. 1.

Referring now to FIG. 6, the controller 52 can execute a calibration process flow 100 for automatically learning an optimum operating velocity for air speed in the system with minimal user input. Beginning at step 102, the controller 52 can begin the calibration procedure manually when triggered by an operator, and/or automatically when triggered by operation in the field, upon detecting a change in a current particulate material type being dispensed and/or a rate of dispensing the particulate material (mass flow rate). Next, at decision step 104, the controller 52 can determine whether a current particulate material type being dispensed and/or a rate of dispensing the particulate material (mass flow rate) is new to the system. If the current particulate material type and/or rate is not new ("No"), then at step 106 a previously established operating velocity for air speed in the system can be retrieved from a data structure held in the memory device 58 for rapid configuration.

However, if the current particulate material type and/or rate is new ("Yes"), then a new operating velocity for the product mass flow rate can be established beginning at step 108. To do so, the controller 52 can control the air source 27 to produce the air speed at a default initial velocity ($v_{default}$). The initial velocity is preferably a maximum velocity producible by the air source 27. This can ensure that plugging or blockages do not occur in the system (since the air speed will be excessively high to begin with). Then, at step 110, once the measured air speed has achieved the initial velocity ($v_{default}$), a measured pressure gradient across a monitoring region in one or more of the primary lines 26 can be recorded. Then, at step 112, the controller 52 can control the air source 27 to lower the velocity of the air flow by an increment, such as by reducing the fan speed. Then, at step 114, at this newly established, incrementally lower speed, another pressure gradient measurement can be recorded.

Next, at decision step 116, with two pressure gradient measurements at two different velocities or speeds having been recorded, a slope of the pressure gradient versus air speed curve can be approximated by the most recent pressure gradient measurement subtracted from the prior pressure gradient measurement, divided by the most recent air speed setting subtracted from the prior air speed setting. This essentially constructs the first and/or second graphs 70 and/or 90, respectively, as discussed above with respect to FIGS. 4 and 5. If the subtracted quantities are both positive, then the slope of the operating curve in the current region is positive, with the new operating point in the operating region 74 (to the right of the minimum velocity ($v_{critical}$)) ("Yes"). Then, at step 118, the current air speed can be saved as an intermediate value of $v_{critical}$ because until a lower air speed can be tested, the current air speed is the last known value to the right of the true critical air speed. Then, at step 120, the index can be incremented by 1, and returning to step 112, a new (lower) air speed can be set, followed by the pressure gradients being measured again upon the system reaching this new air speed at step 114. This loop of repeatedly determining a pressure gradient in one or more of the primary lines 26 and controlling the air source 27 to lower the velocity of the air flow by an increment can continue until a minimum velocity for the air flow causing a minimum pressure gradient is determined.

Eventually, at decision step 116, the slope of the operating curve in the current region may be determined to be negative, with the new operating point being outside of the operating region 74 (to left right of $v_{critical}$) ("No") for proceeding to step 122. This can occur when the difference in pressure gradient measurements has a sign opposite to the change in air speed. The new operating point represents an increase in pressure gradient for a decrease in air speed resulting in a negative slope. This new point is to the left of the true critical air speed, therefore the previous air speed setting is the closest known value to the critical air speed. The previous air speed therefore remains as $v_{critical}$. In one aspect, the minimum velocity ($v_{critical}$) could be configured by the controller 52, by adjusting the air source 27, as the final operating velocity for the air flow in the system. This could be stored in the data structure, based on the particulate material type and/or rate, establishing an operating velocity that can be retrieved at a later date at step 106.

However, preferably, at step 124, to maintain a safe operating margin from air speeds that risk plugging or blockage of the system, a predetermined margin δ can be added to $v_{critical}$ for configuring the operating velocity with margin ($v_{safe}$) for the air speed in the system. The $v_{safe}$ operating target air speed for the current product mass flow can be calculated as $v_{safe} = v_{critical} + δ$. The value of δ can be either pre-programmed during product development or set by the operator, for example. Aside from product type, and potentially product mass flow rate (either of which may be provided from an operator to operate an air cart), δ could be the only operator-determined input value to operate the system. The optimum operating velocity ($v_{safe}$) could be configured by the controller 52, by adjusting the air source 27, as the final operating velocity for the air flow in the system. This could be stored in the data structure, based on the particulate material type and/or rate, establishing an optimum operating velocity that can be retrieved at a later date at step 106. The calibration procedure of FIG. 6 could be done manually or automatically via a controller or ISO Bus Class 3 operation, such as ISO 11783 communication and control, with minimal to no input from an operator.

In addition, the system could include one or more environmental sensors 160 for measuring various environmental conditions for further compensating the operating velocity. The environmental sensors 160 could include, for example, one or more temperature sensors 160a inside the primary line 26; an ambient temperature sensor 160b external to the air cart 12; an ambient pressure sensor 160c external to the air cart 12, and/or a humidity sensor 160d external to the air cart 12. The controller 52 could receive feedback from the environmental sensors 160 and compensate the operating velocity corresponding to the air speed according to the environmental condition, such as increasing the velocity of the air flow by 0.5 m/s when experiencing hot, humid environmental conditions, and/or decreasing the velocity of the air flow by 0.5 m/s when experiencing cold, dry environmental conditions.

Figure 7:
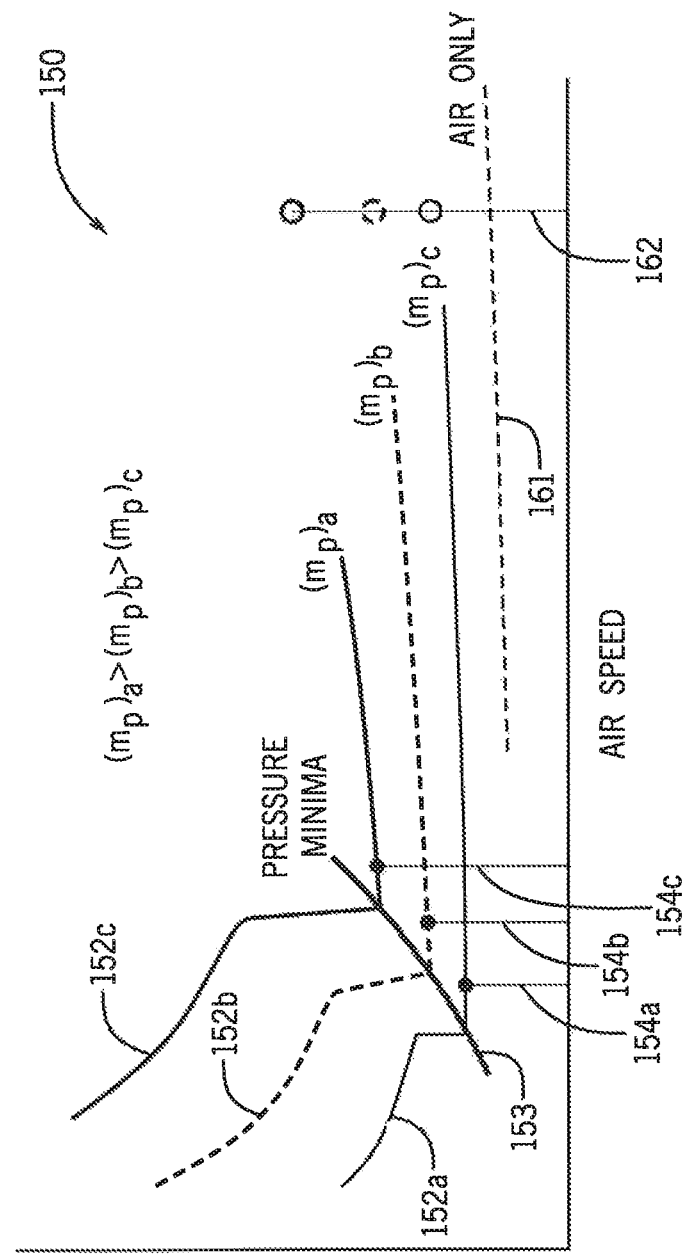
FIG. 7 is a graph illustrating exemplary predetermined air flow settings for distributing particulate material at differing flow rates in accordance with an aspect of the invention.

For improved control, multiple predetermined air speed settings for distributing differing particulate materials at differing flow rates through pneumatic conveying systems of the system can be stored in accordance with an aspect of the invention. Referring now to FIG. 7, a graph 150 illustrating a set of exemplary predetermined air speed settings 152 for distributing a given type of particulate material at differing flow rates is provided in accordance with an aspect of the invention. Like the graphs of FIGS. 4 and 5, the graph 150 can relate pressure gradients in primary lines 26 on a vertical axis (y-axis) to velocities (or air speeds) in the primary lines 26 on a horizontal axis (x-axis). The set of exemplary predetermined air speed settings 152 could be specific to a given particular granular particulate material, such as peas. This set could be stored with other sets for other particulate materials, such as sets for other types of seeds and/or fertilizers, in a data structure held in the memory device 58. Alternatively, a set of predetermined air speed settings could be specific to a dispensing rate for different particulate materials.

In the graph 150, each predetermined air speed setting 152 could comprise a velocity for an air flow corresponding to the given type of particulate material and a given rate for dispensing particulate material. For example, the first predetermined air speed setting 152a could comprise an optimum operating velocity which could be configured for an air flow corresponding to a first type of particulate material, such as peas, at a first rate for dispensing the first type of particulate material (a first mass flow rate "$(m_p)a$"); the second predetermined air speed setting 152b could comprise an optimum operating velocity which could be configured for an air flow corresponding to the same first type of particulate material (e.g., peas) at a second rate for dispensing the first type of particulate material (a second mass flow rate "$(m_p)b$"); and the third predetermined air speed setting 152c could comprise an optimum operating velocity which could be configured for an air flow corresponding to the same first type of particulate material (e.g., peas) at a third rate for dispensing the first type of particulate material (a third mass flow rate "$(m_p)c$"); and so forth. As shown, the dispensing rate associated with the first predetermined air speed setting 152a is greater than the dispensing rates associated with the second and third predetermined air speed settings 152b and 152c, respectively; and the dispensing rate associated with the second predetermined air speed setting 152b is greater than the dispensing rate associated with the third predetermined air speed setting 152c. These dispensing rates are further compared to an air only curve 161, without dispensing of any particulate material, by way of reference, which results in a consistent, relatively low pressure drop with slight increases with increases in air speed.

Accordingly, a differential pressure minima for each predetermined air speed setting, which occurs at increasing air speeds with increasing mass flow rates as provided by the differential pressure minima curve 153, can be quickly referenced for minimum velocities ($v_{critical}$). With a predetermined margin δ added to each minimum velocity ($v_{critical}$), an optimum operating velocity ($v_{safe}$) 154 could be readily retrieved by the controller 52 from the data structure for configuring the air speed according to the type of particulate material and/or rate of dispensing. Moreover, this operating velocity ($v_{safe}$) 154 is quickly determined as an operating velocity that is less than a default high velocity 162 which may be generic to all types and rates, which default could be a maximum velocity producible by the air source 27 and/or a velocity determined from a "fountain" test, thereby resulting in immediate efficiencies. For example, when commanded to dispense the first type of particulate material (e.g., peas) at a maximum dispensing rate, such as according to input from an operator or a location on a prescription map, the controller 52 could reference the first predetermined air speed setting 152a to retrieve the operating velocity 154a for rapid configuration of an optimum setting for an air flow generated by the air source 27. Such rapid retrieval and configuration may be particularly advantageously with fully autonomous seeding systems.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

What is claimed is:

1. A system for distributing particulate material to an agricultural field, comprising:
    a meter module configured to dispense particulate material to a product distribution line;
    an air source configured to entrain the particulate material in an air flow for transferring the particulate material through the product distribution line;
    first and second pressure sensors arranged at first and second locations of the product distribution line, respectively, the first pressure sensor being arranged at a first location proximal to the meter module and the second pressure sensor being arranged at a second location distal to the meter module, wherein each pressure sensor is configured to indicate a pressure at a location in the product distribution line; and
    a controller in communication with the air source and the first and second pressure sensors, the controller executing a program stored in a non-transient medium to:
    control the air source to maintain the air flow at an initial velocity, wherein the initial velocity is a maximum velocity producible by the air source;
    repeatedly determine a pressure gradient in the product distribution line by calculating a difference between first and second pressures indicated by the first and second pressure sensors, respectively; and
    control the air source to lower the velocity of the airflow from the initial velocity, until a minimum velocity for the air flow causing a minimum pressure gradient sufficient to maintain entrained particulate material is determined; and
    control the air flow at a velocity greater than the minimum velocity by a predetermined margin,
    wherein a rate in which the meter module dispenses the particulate material increases or decreases, and wherein the controller executes to increase or decrease the air flow to maintain the velocity at the predetermined margin or calculates a new margin.

2. The system of claim 1, wherein a type of the particulate material in which the meter module dispenses changes, and wherein the controller executes to increase or decrease the air flow to maintain the velocity at the predetermined margin or calculates a new margin.

3. The system of claim 2, wherein the particulate material is selected from the group consisting of seed and fertilizer.

4. The system of claim 1, wherein the air source comprises a fan, and wherein the controller executes to control the air source to increase or decrease the air flow by increasing or decreasing hydraulic fluid to the fan.

5. The system of claim 1, further comprising an air speed sensor in communication with the controller, wherein the air speed sensor is configured to indicate a velocity of the air flow in the product distribution line.

6. A method for distributing particulate material to an agricultural field, comprising:
 dispensing particulate material from a meter module to a product distribution line;
 entraining the particulate material in an air flow produced by an air source for transferring the particulate material through the product distribution line;
 determining a pressure gradient in the product distribution line by calculating a difference between first and second pressures indicated by first and second pressure sensors, respectively, wherein the first and second pressure sensors are arranged at first and second locations of the product distribution line, respectively, with the first pressure sensor being arranged at a first location proximal to the meter module and the second pressure sensor being arranged at a second location distal to the meter module;
 controlling the air source to produce the air flow at an initial velocity, wherein the initial velocity is a maximum velocity producible by the air source;
 controlling the air source to lower the velocity of the air flow from the initial velocity, until a minimum velocity for the air flow causing a minimum pressure gradient sufficient to maintain entrained particulate material is determined;
 configuring the velocity for the air flow to be greater than the minimum by a predetermine margin,
 increasing or decreasing a rate in which the meter module dispenses the particulate material, and
 increasing or decreasing the air flow to maintain the velocity above the predetermined margin or calculating a new margin.

7. The method of claim 6, further comprising changing a type of the particulate material in which the meter module dispenses, and further comprising increasing or decreasing the air flow to maintain the velocity at the predetermined margin or calculating the new margin.

8. A system for distributing particulate material to an agricultural field, comprising:
 an air cart comprising:
 a product storage tank configured to store particulate material;
 a meter module configured to dispense the particulate material from the product storage tank to a primary product distribution line; and
 a fan configured to entrain the particulate material in an air flow for transferring the particulate material through the primary product distribution line;
 an agricultural implement comprising:
 a product distribution header configured to receive the particulate material from the air cart through the primary product distribution line; and
 a plurality of row units, each row unit being configured to receive the particulate material from the product distribution header through a secondary product distribution line and deposit the particulate material to the agricultural field;
 first and second pressure sensors arranged at first and second locations of the product distribution line, respectively, the first pressure sensor being arranged at a first location proximal to the meter module and the second pressure sensor being arranged at a second location distal to the meter module, wherein each pressure sensor is configured to indicate a pressure at a location in the product distribution line; and
 a controller in communication with the fan and the first and second pressure sensors, the controller executing a program stored in a non-transient medium to:
 control the fan to produce the air flow at an initial velocity, wherein the initial velocity is a maximum velocity producible by the air source;
 determine a pressure gradient in the product distribution line by calculating a difference between first and second pressures indicated by the first and second pressure sensors, respectively; and
 control the air source to lower the velocity of the air flow from the initial velocity until a minimum velocity and a minimum pressure gradient sufficient to maintain entrained particulate material is determined; and
 configure the velocity of the air flow to be greater than the minimum velocity by a predetermined margin,
 wherein a rate in which the meter module dispenses the particulate material increase or decreases, and wherein the controller executes to increase or decrease the air flow to maintain the velocity at the predetermined margin or calculates a new margin.

9. The system of claim 8, wherein a type of the particulate material in which the meter module dispenses changes, and wherein the controller executes to increase or decrease the air flow to maintain the velocity at the predetermined margin or the new margin.

10. The system of claim 8, wherein the particulate material is selected from the group consisting of seed and fertilizer.

11. The system of claim 8, wherein a diameter of the product distribution line changes between the first and second locations.

* * * * *